(12) United States Patent
Ha

(10) Patent No.: US 12,208,509 B2
(45) Date of Patent: Jan. 28, 2025

(54) METHOD, SYSTEM, AND NON-TRANSITORY COMPUTER-READABLE RECORDING MEDIUM FOR CONTROLLING A SERVING ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 173 days.

(21) Appl. No.: 17/386,978

(22) Filed: Jul. 28, 2021

(65) Prior Publication Data

US 2023/0030633 A1 Feb. 2, 2023

(51) Int. Cl.
*B25J 11/00* (2006.01)
*B25J 9/16* (2006.01)

(52) U.S. Cl.
CPC ........... *B25J 11/0045* (2013.01); *B25J 9/163* (2013.01); *B25J 9/1661* (2013.01); *B25J 11/008* (2013.01)

(58) Field of Classification Search
CPC ...... B25J 11/0045; B25J 9/163; B25J 9/1661; B25J 11/008; B25J 9/1664; B25J 5/007; B25J 9/1656; B25J 11/0005; G06Q 10/0633; G06Q 30/0633; G06Q 10/0631; G06Q 30/015; G06Q 30/0281; G06Q 30/0601; G06Q 50/12; G05B 2219/39453
See application file for complete search history.

(56) References Cited

U.S. PATENT DOCUMENTS

| | | | |
|---|---|---|---|
| 2017/0199762 A1* | 7/2017 | Bufe, III | G06F 9/4881 |
| 2019/0236531 A1* | 8/2019 | Adato | G06V 20/20 |
| 2020/0118194 A1* | 4/2020 | Greenberger | G06Q 30/0635 |
| 2021/0053233 A1* | 2/2021 | Hatayama | G06V 20/20 |
| 2021/0174370 A1* | 6/2021 | Yim | B25J 11/0045 |
| 2021/0347061 A1* | 11/2021 | Totsuka | F24C 7/04 |
| 2021/0379766 A1* | 12/2021 | Kawamoto | B25J 9/1661 |
| 2021/0391051 A1* | 12/2021 | Ochiai | G05B 19/042 |
| 2022/0048196 A1* | 2/2022 | Sato | B25J 11/0045 |
| 2022/0346598 A1* | 11/2022 | Sinnet | A47J 37/1219 |

FOREIGN PATENT DOCUMENTS

| | | |
|---|---|---|
| JP | 2017221991 A | 12/2017 |
| JP | 2018094645 A | 6/2018 |
| JP | 2019008550 A | 1/2019 |
| KR | 101083700 B1 | 11/2011 |
| KR | 1020190005001 A | 1/2019 |
| KR | 1020190092337 A | 8/2019 |

* cited by examiner

*Primary Examiner* — Abby Y Lin
*Assistant Examiner* — Eswinder Singh
(74) *Attorney, Agent, or Firm* — Dinsmore & Shohl LLP; Yongsok Choi, Esq.

(57) ABSTRACT

A method for controlling a serving robot is provided. The method includes the steps of: acquiring situation information on at least one customer; dynamically determining a workflow for the at least one customer on the basis of the situation information on the at least one customer, using a workflow determination model for determining workflows related to services capable of being provided in a serving place; and causing a target service to be provided to the at least one customer on the basis of the determined workflow.

15 Claims, 4 Drawing Sheets

300

METHOD, SYSTEM, AND NON-TRANSITORY COMPUTER-READABLE RECORDING MEDIUM FOR CONTROLLING A SERVING ROBOT

FIELD OF THE INVENTION

The present invention relates to a method, system, and non-transitory computer-readable recording medium for controlling a serving robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

Meanwhile, in order to increase a customer's satisfaction in a serving place such as a restaurant, it is necessary not only to serve appetizing food but also to provide suitable services at appropriate times from when the customer arrives at the serving place to when the customer leaves the serving place after eating and paying. For example, services such as reception, guiding to seats, providing water or the like, taking orders, serving food, providing necessary services during eating (e.g., replenishing the water or the like, collecting empty dishes (i.e., bussing), etc.) or asking about the services, and requesting payment should be provided to a customer visiting the restaurant at appropriate times in order to increase the customer's satisfaction. However, the techniques introduced so far as well as the above-described conventional technique have failed to suggest causing a serving robot to provide a suitable service to a customer at an appropriate time on the basis of situation information (e.g., order status, eating status, service provision status, etc.) acquired with respect to the customer.

In this connection, the inventor(s) present a technique for determining a workflow for a customer on the basis of situation information on the customer, and causing a suitable service to be provided to the customer at an appropriate time on the basis of the determined workflow.

SUMMARY OF THE INVENTION

One object of the present invention is to solve all the above-described problems in the prior art.

Another object of the invention is to: acquire situation information on at least one customer; dynamically determine a workflow for the at least one customer on the basis of the situation information on the at least one customer, using a workflow determination model for determining workflows related to services capable of being provided in a serving place; and cause a target service to be provided to the at least one customer on the basis of the determined workflow.

Yet another object of the invention is to determine a workflow for a customer on the basis of situation information on the customer, and cause a suitable service to be provided to the customer at an appropriate time on the basis of the determined workflow.

Still another object of the invention is to monitor a situation in which a target service is provided to at least one customer, and derive the number of serving robots suitable for use in a serving place on the basis of a result of the monitoring.

The representative configurations of the invention to achieve the above objects are described below.

According to one aspect of the invention, there is provided a method for controlling a serving robot, the method comprising the steps of: acquiring situation information on at least one customer; dynamically determining a workflow for the at least one customer on the basis of the situation information on the at least one customer, using a workflow determination model for determining workflows related to services capable of being provided in a serving place; and causing a target service to be provided to the at least one customer on the basis of the determined workflow.

According to another aspect of the invention, there is provided a system for controlling a serving robot, the system comprising: a situation information acquisition unit configured to acquire situation information on at least one customer; a workflow management unit configured to dynamically determine a workflow for the at least one customer on the basis of the situation information on the at least one customer, using a workflow determination model for determining workflows related to services capable of being provided in a serving place; and a target service management unit configured to cause a target service to be provided to the at least one customer on the basis of the determined workflow.

In addition, there are further provided other methods and systems to implement the invention, as well as non-transitory computer-readable recording media having stored thereon computer programs for executing the methods.

According to the invention, it is possible to: acquire situation information on at least one customer; dynamically determine a workflow for the at least one customer on the basis of the situation information on the at least one customer, using a workflow determination model for determining workflows related to services capable of being provided in a serving place; and cause a target service to be provided to the at least one customer on the basis of the determined workflow.

According to the invention, it is possible to determine a workflow for a customer on the basis of situation information on the customer, and cause a suitable service to be provided to the customer at an appropriate time on the basis of the determined workflow.

According to the invention, it is possible to monitor a situation in which a target service is provided to at least one customer, and derive the number of serving robots suitable for use in a serving place on the basis of a result of the monitoring.

DETAILED DESCRIPTION OF THE INVENTION

Figure 1:
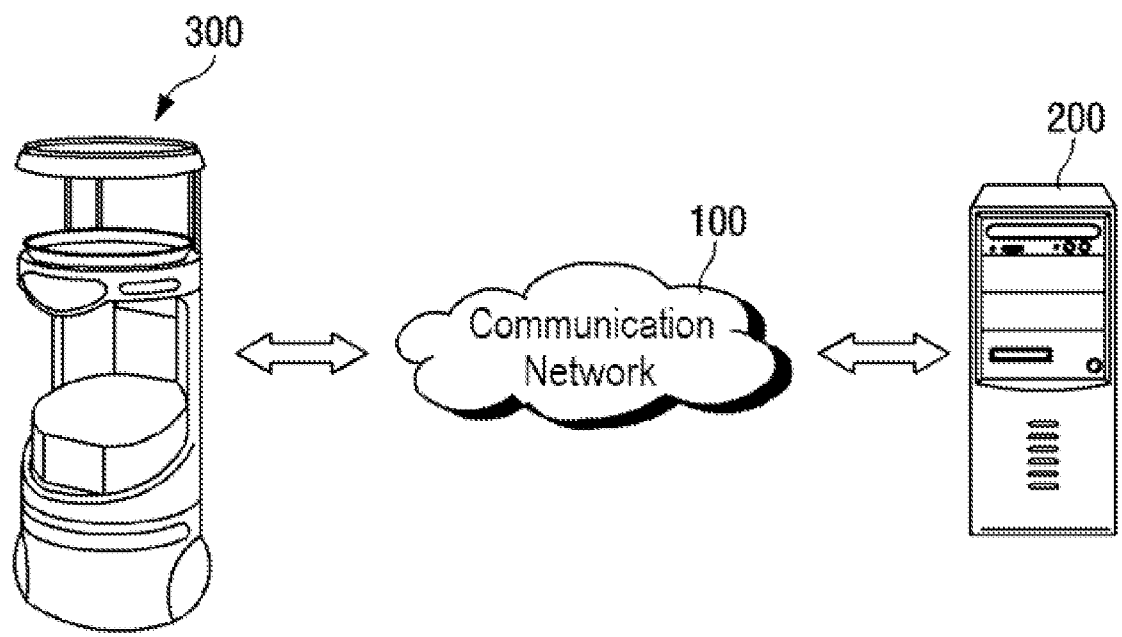
FIG. 1 schematically shows the configuration of an entire system for controlling a serving robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a serving robot according to one embodiment of the invention.

As shown in FIG. 1, the entire system according to one embodiment of the invention may comprise a communication network 100, a robot control system 200, and a serving robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may function to: acquire situation information on at least one customer; dynamically determine a workflow for the at least one customer on the basis of the situation information on the at least one customer, using a workflow determination model for determining workflows related to services capable of being provided in a serving place; and cause a target service to be provided to the at least one customer on the basis of the determined workflow.

The configuration and functions of the robot control system 200 according to the invention will be discussed in more detail below.

Next, the serving robot 300 according to one embodiment of the invention is a device capable of communicating with the robot control system 200 via the communication network 100 and performing predetermined functions or assigned tasks (e.g., serving food, retrieving containers, etc.) autonomously without any operation of a user (e.g., an employee or a customer), and may include a support configured to support at least one object. The serving robot 300 according to one embodiment of the invention may include at least one of a module (e.g., a grab or a robotic arm module) for loading and unloading an object (e.g., a food tray), an image acquisition module (e.g., a visible light camera or an infrared camera) for acquiring images of surroundings, a scanner module (e.g., a LIDAR sensor) for acquiring information on obstacles, a sound acquisition module (e.g., a microphone) for acquiring sounds of surroundings, a display and speaker module for providing images and sounds, and a drive module (e.g., a motor) for moving the serving robot 300.

For example, the serving robot 300 may have characteristics or functions similar to those of at least one of a guide robot, a transport robot, a cleaning robot, a medical robot, an entertainment robot, a pet robot, and an unmanned flying robot. Meanwhile, supporting of an object herein should be interpreted as encompassing supporting of a container for containing an object such as food, a means where the container may be placed (e.g., a tray), or the like.

Meanwhile, according to one embodiment of the invention, the serving robot 300 may include an application (not shown) for controlling the serving robot 300 according to the invention. The application may be downloaded from the robot control system 200 or an external application distribution server (not shown). According to one embodiment of the invention, the characteristics of the application may be generally similar to those of a situation information acquisition unit 210, a workflow management unit 220, a target service management unit 230, a communication unit 240, and a control unit 250 of the robot control system 200 to be described below. Here, at least a part of the application may be replaced with a hardware device or a firmware device that may perform a substantially equal or equivalent function, as necessary.

Figure 3:
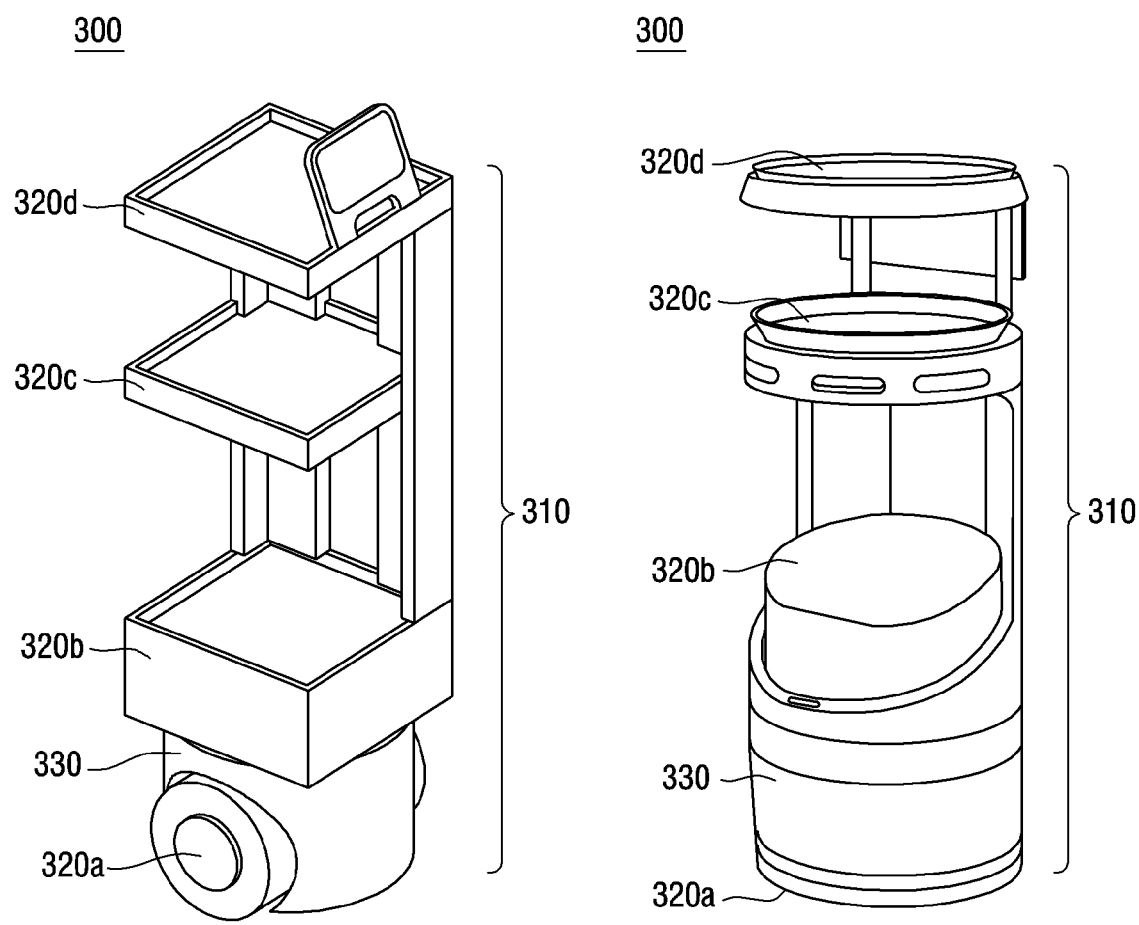
FIG. 3 illustratively shows the structure of a serving robot according to one embodiment of the invention.
Figure 4:
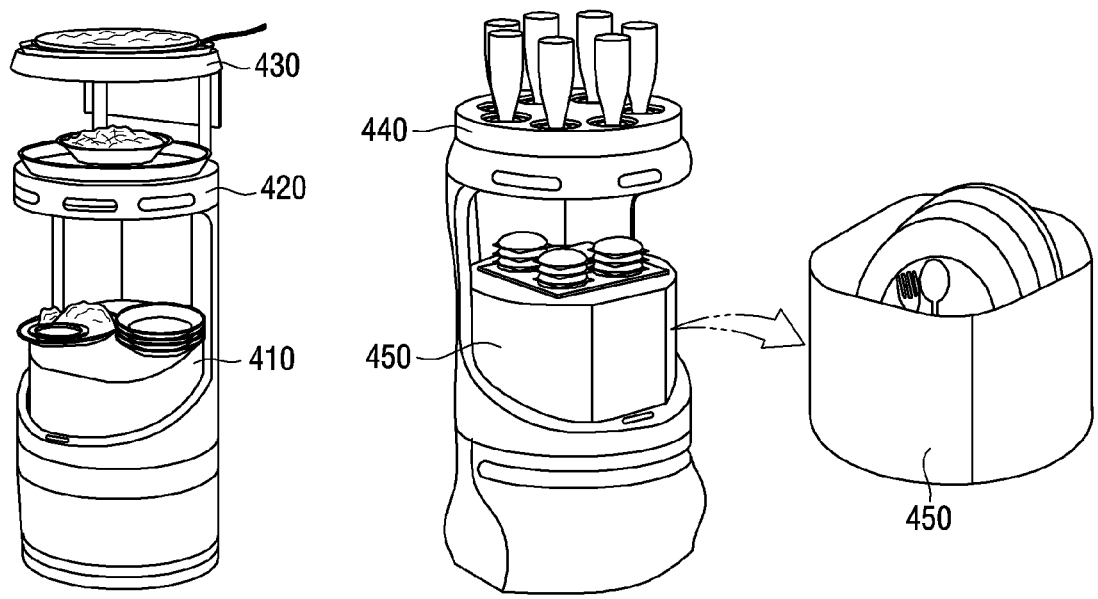
FIG. 4 illustratively shows the structure of a serving robot according to one embodiment of the invention.

FIGS. 3 and 4 illustratively show the structure of the serving robot 300 according to one embodiment of the invention.

Referring to FIG. 3, the serving robot 300 may comprise a main body 310, a drive unit 320*a*, and a processor 330.

First, the main body 310 according to one embodiment of the invention may be coupled to supports 320*b*, 320*c*, and 320*d* configured to support at least one object. According to one embodiment of the invention, the supports 320*b*, 320*c*, and 320*d* may be removably coupled for cleaning, replacement, or the like. Further, each of the supports 320*b*, 320*c*, and 320*d* may include a weight sensor (not shown) for sensing a weight supported by each of the supports 320*b*, 320*c*, and 320*d*. According to one embodiment of the invention, the weight sensor may be implemented using one or more strain gauges (e.g., three strain gauges, four strain gauges, or the like). In addition, according to one embodiment of the invention, the weight sensor may be coupled to the processor 330.

Further, the main body 310 according to one embodiment of the invention may include a photographing module (not shown) configured to photograph a spatial region above each of the supports 320*b*, 320*c*, and 320*d*, in place of or in addition to the weight sensor. Meanwhile, according to one embodiment of the invention, the photographing modules configured to photograph the spatial regions above the respective supports 320*b*, 320*c*, and 320*d* are not necessarily included in the main body 310, and at least some of the photographing modules may be installed on a structure in a serving place.

Meanwhile, the main body 310 according to one embodiment of the invention may include at least one loading space for loading an object. Further, according to one embodiment of the invention, the at least one loading space may include the supports 320*b*, 320*c*, and 320*d*. The object according to one embodiment of the invention may refer to all material objects that can be moved by the serving robot 300, and may encompass things, animals, and the like. For example, the object according to one embodiment of the invention may include a serving object such as food and a bussing object such as a container containing the food.

Referring to FIG. 4, the serving robot 300 according to one embodiment of the invention may include a first space 410 and a second space 420 for providing a serving object (i.e., serving) and collecting a bussing object (i.e., bussing). Further, the serving robot 300 may further include a third space 430 that is an expansion space provided via a removable pillar, and more loading spaces may be provided by adding more expansion spaces as needed. Further, the serving robot 300 may further include a tray 440 dedicated for the serving object or the bussing object. For example, the tray 440 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 410 of the serving robot 300 may include a fourth space 450 that may be taken out through a lateral side of the serving robot 300.

The fourth space 450 according to one embodiment of the invention may have a shape similar to a basket, such that an empty space is formed therein; a lateral side thereof is closed; atop side thereof is open; and a bottom side thereof is closed. However, the loading spaces of the serving robot 300 according to the invention are not necessarily limited to the above description, and may be diversely implemented as other types of loading spaces as long as the objects of the invention may be achieved.

Next, referring to FIG. 3 again, the drive unit 320*a* according to one embodiment of the invention may comprise a module for moving the main body 310 to other locations. For example, the drive unit 320*a* may include a module related to electrically, mechanically, or hydraulically driven wheels, propellers, or the like as the module for moving the main body 310 to other locations.

Next, the processor 330 according to one embodiment of the invention may be electrically connected to the drive unit 320*a* to perform a function of controlling the drive unit 320*a* (and may include a communication module for communicating with an external system). For example, the processor 330 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 330 may perform the functions of at least one of the situation information acquisition unit 210, the workflow management unit 220, and the target service management unit 230 of the robot control system 200 according to the invention (e.g., the corresponding functions may be modularized and included in the processor 330), and may function to control the drive unit 320*a* through communication with an external system (not shown) that performs the functions of at least one of the situation information acquisition unit 210, the workflow management unit 220, and the target service management unit 230.

Specifically, the processor 330 may function to: acquire situation information on at least one customer; dynamically determine a workflow for the at least one customer on the basis of the situation information on the at least one customer, using a workflow determination model for determining workflows related to services capable of being provided in a serving place; and cause a target service to be provided to the at least one customer on the basis of the determined workflow.

Configuration of the Robot Control System

Hereinafter, the internal configuration of the robot control system 200 crucial for implementing the invention and the functions of the respective components thereof will be discussed.

Figure 2:
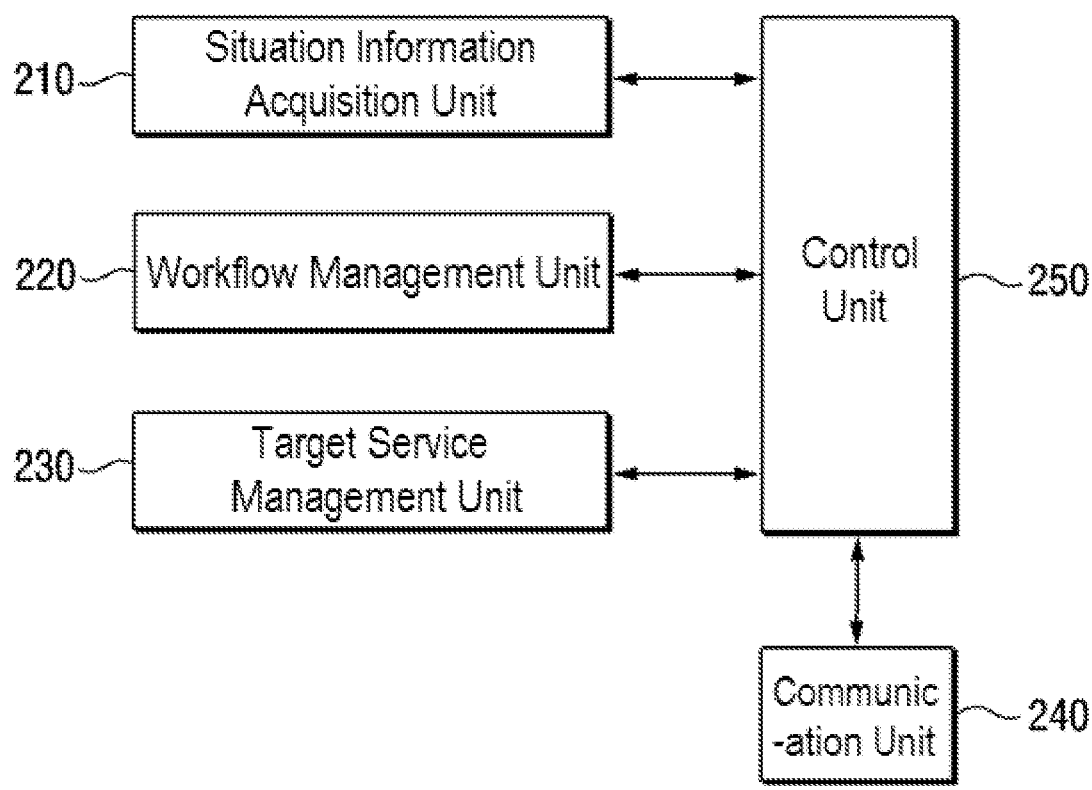
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise a situation information acquisition unit 210, a workflow management unit 220, a target service management unit 230, a communication unit 240, and a control unit 250. According to one embodiment of the invention, at least some of the situation information acquisition unit 210, the workflow management unit 220, the target service management unit 230, the communication unit 240, and the control unit 250 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the serving robot 300 or an external system (not shown), as necessary. Further, in some cases, all of the functions and components of the robot control system 200 may be implemented or included in the serving robot 300.

First, the situation information acquisition unit 210 according to one embodiment of the invention may function to acquire situation information on at least one customer.

Specifically, according to one embodiment of the invention, the situation information on the at least one customer may refer to any information necessary to provide a suitable service to the at least one customer at an appropriate time, among information that may be acquired with respect to the at least one customer from when the at least one customer arrives at a serving place such as a restaurant to when the at least one customer leaves the serving place after eating and paying. According to one embodiment of the invention, the situation information on the at least one customer may include identification information on the at least one customer, order status of the at least one customer, eating status of the at least one customer, and status of service provision for the at least one customer. Meanwhile, it should be understood that the term "customer" herein may refer to a specific person, but may also refer to a group including the specific person (i.e., the specific person and his/her party).

For example, the identification information on the at least one customer may include information on composition of the at least one customer (e.g., the at least one customer's gender, headcount, age, etc.), information on identity of the at least one customer (if the identity can be specifically recognized), and the like, and the order status of the at least one customer may include food ordered by the at least one customer, information on an additional order (if any), information on an ordered drink (if any), and the like. Further, according to one embodiment of the invention, the eating status of the at least one customer may include an extent to which the at least one customer has eaten (i.e., how much the ordered food has been eaten), an extent to which the at least one customer's cup (or bottle) contains a drink, an amount of time having elapsed from when the food ordered by the at least one customer is provided, and the like, and the status of service provision for the at least one customer may include information on what service has been provided to the at least one customer, when the service has been provided to the at least one customer, and the like.

However, the situation information on the at least one customer according to one embodiment of the invention is not limited to the foregoing and may be diversely changed as long as the objects of the invention may be achieved.

Meanwhile, the situation information acquisition unit 210 according to one embodiment of the invention may acquire the situation information on the at least one customer using an image acquisition module (e.g., a visible light camera or an infrared camera) for acquiring images of surroundings, a sound acquisition module (e.g., a microphone) for acquiring sounds of surroundings, and the like, and the above modules may be included in the serving robot 300 or installed on a structure in the serving place. Further, according to one embodiment of the invention, some of the situation information on the at least one customer may be inputted by a user. For example, when information indicating that a particular service has been provided to a specific customer is inputted by an employee, the situation information acquisition unit 210 according to one embodiment of the invention may acquire the inputted information as situation information on the specific customer (specifically, status of service provision for the specific customer).

Next, the workflow management unit 220 according to one embodiment of the invention may function to dynamically determine a workflow for the at least one customer on the basis of the situation information on the at least one customer acquired by the situation information acquisition unit 210 according to one embodiment of the invention.

Specifically, according to one embodiment of the invention, the workflow for the at least one customer may refer to a kind of list enumerating a series of sequential services that may be (or should be) provided to the at least one customer from the present (i.e., a time when the workflow management unit 220 according to one embodiment of the invention determines the workflow for the at least one customer) to when the at least one customer finishes eating and paying and leaves the serving place. For example, according to one embodiment of the invention, the above services may include reception, guiding to seats, providing water or the like, taking orders, serving food, replenishing the water or the like, providing necessary services during eating (e.g., bussing) or asking about the services, and requesting payment.

More specifically, according to one embodiment of the invention, the workflow for the at least one customer may include information on a service to be provided, a customer to whom (or a table to which) the service is to be provided, and a time when the service is to be provided. To this end, the workflow for the at least one customer may include at least one service that may be (or should be) provided to the at least one customer, and priority of each of the at least one service in the format of a time and/or turn in which each of the at least one service is to be provided. The workflow management unit 220 according to one embodiment of the invention may manage the workflow for the at least one customer using, but not limited to, a data structure or the like having the nature of a priority queue.

For example, when a customer arrives at the serving place, the workflow management unit 220 according to one embodiment of the invention may determine a workflow for the customer on the basis of identification information on the customer, such as information on composition of the customer (e.g., the customer's gender, headcount, age, etc.) and information on identity of the customer (if the identity can be specifically recognized), among situation information on the customer. Here, when the workflow for the customer may be differently determined depending on food ordered by the customer, for example, the workflow management unit 220 according to one embodiment of the invention may first determine only a workflow for a period of time until food is ordered by the customer, and may determine a subsequent workflow after the food is ordered.

As another example, the workflow management unit 220 according to one embodiment of the invention may dynamically determine a workflow for the customer on the basis of order status of the customer (e.g., food ordered by the customer, information on an additional order (if any), information on an ordered drink (if any), etc.), among the situation information on the customer. For example, when there is a specific workflow associated with the food ordered by the customer or an additional menu is ordered by the customer, the workflow management unit 220 according to one embodiment of the invention may appropriately change a predetermined workflow. Further, when the customer orders a drink, the workflow management unit 220 according to one embodiment of the invention may determine the workflow for the customer in a manner to reduce priority of a water replenishment service for the customer (i.e., in a manner to delay a time or turn in which the water replenishment service is to be provided).

As yet another example, the workflow management unit 220 according to one embodiment of the invention may dynamically determine a workflow for the customer on the basis of eating status of the customer (e.g., an extent to which the customer has eaten, an extent to which the customer's cup (or bottle) contains a drink, an amount of time having elapsed from when the food ordered by the customer is provided, etc.), among the situation information on the customer. For example, as there are more empty dishes on the table where the customer is located and/or as the amount of time having elapsed from when the food ordered by the customer is provided is greater, the workflow management unit 220 according to one embodiment of the invention may determine the workflow for the customer in a manner to increase priority of a bussing service for the customer. Further, as the customer's cup (or bottle) contains a less amount of drink, the workflow management unit 220 according to one embodiment of the invention may determine the workflow for the customer in a manner to increase priority of a drink replenishment service for the customer (including a service such as refilling the drink or asking about intention for an additional order for the drink).

As still another example, the workflow management unit 220 according to one embodiment of the invention may dynamically determine a workflow for the customer on the basis of status of service provision for the customer (e.g., information on what service has been provided to the customer, when the service has been provided to the customer, etc.), among the situation information on the customer. For example, when an employee or the serving robot 300 has provided a specific service to the customer at the customer's request, or the employee has provided a specific service to the customer on his/her own, irrespective of the workflow for the customer, the workflow management unit 220 according to one embodiment of the invention may determine the workflow for the customer in a manner to reduce priority of the specific service provided as above.

That is, the workflow management unit 220 according to one embodiment of the invention may dynamically determine a workflow for the customer on the basis of the situation information on the customer, in a manner to include a suitable service in the workflow for the customer, exclude a specific service from the workflow for the customer, or change priority of a specific service in the workflow for the customer, for example.

Further, the workflow management unit 220 according to one embodiment of the invention may determine a workflow for the at least one customer on the basis of a type of the serving place.

For example, the workflow management unit 220 according to one embodiment of the invention may differently determine the workflow for the at least one customer depending on the type of the serving place, such as an unlimited refill restaurant (e.g., an all-you-can-eat restaurant), a fast food restaurant, and a common restaurant. Meanwhile, according to one embodiment of the invention, when the serving place is an unlimited refill restaurant, the workflow for the at least one customer may include a refill food serving service. In this case, the workflow management unit 220 according to one embodiment of the invention may dynamically determine the workflow for the at least one customer by adjusting priority of a refill food serving service to be provided to the at least one customer such that food may be refilled at appropriate intervals, on the basis of the situation information on the at least one customer (e.g., the at least one customer's headcount, gender, age, amount of time having elapsed from arrival at the restaurant, extent of eating, amount of time having elapsed from last food serving, etc.)

Meanwhile, in determining the workflow for the at least one customer as above, the workflow management unit 220 according to one embodiment of the invention may use a workflow determination model for determining workflows related to services that may be provided in the serving place.

Specifically, when the situation information on the at least one customer is acquired by the situation information acquisition unit 210 according to one embodiment of the invention, the workflow management unit 220 according to one embodiment of the invention may dynamically determine the workflow for the at least one customer by inputting the situation information on the at least one customer to the workflow determination model.

According to one embodiment of the invention, the workflow determination model may be customized by a user (e.g., an employee or a customer). For example, the workflow management unit 220 according to one embodiment of the invention may support a user to customize the workflow determination model by providing the user with the workflow for the at least one customer determined using the workflow determination model and/or setting information necessary for the determination of the workflow (e.g., information on a time or turn in which each of the services that may be provided in the serving place is provided, information on whether to provide (or receive) each of the services, etc.)

Further, according to one embodiment of the invention, the workflow determination model may be trained on the basis of the situation information on the at least one customer acquired by the situation information acquisition unit 210 according to one embodiment of the invention and the workflow for the at least one customer determined by the workflow management unit 220 according to one embodiment of the invention.

Specifically, the workflow management unit 220 according to one embodiment of the invention may train the workflow determination model using various machine learning-based algorithms in a manner to reduce differences between the workflow for the at least one customer and the services actually provided to the at least one customer (e.g., differences in the provision order, provision times, types, and the like of the services), so that a more suitable type of service may be provided to the at least one customer at a more appropriate time Next, the target service management unit 230 according to one embodiment of the invention may function to cause a target service to be provided to the at least one customer on the basis of the workflow for the at least one customer determined by the workflow management unit 220 according to one embodiment of the invention.

Specifically, when the workflow for the at least one customer is determined by the workflow management unit 220 according to one embodiment of the invention, the target service management unit 230 according to one embodiment of the invention may cause the serving robot 300 or an employee to provide a target service, i.e., a service to be most preferentially provided to the at least one customer among services included in the workflow for the at least one customer.

More specifically, the target service management unit 230 according to one embodiment of the invention may determine a serving robot 300 to provide the target service to the at least one customer, from among at least one serving robot 300, on the basis of information on task status of the at least one serving robot 300. According to one embodiment of the invention, the information on the task status of the serving robot 300 may include a location of the serving robot 300, a workflow assigned to the serving robot 300 (i.e., information on a service to be provided by the serving robot 300, a customer to whom the service is to be provided, and a time when the service is to be provided), and the like. However, the information on the task status of the serving robot 300 according to one embodiment of the invention is not limited to the foregoing and may be diversely changed as long as the objects of the invention may be achieved.

For example, the target service management unit 230 according to one embodiment of the invention may determine a serving robot 300 closest to the customer to be provided with the target service as the serving robot 300 to provide the target service to the customer.

As another example, the target service management unit 230 according to one embodiment of the invention may determine a serving robot 300 capable of providing the target service, or a serving robot 300 that is most idle in terms of the workflow, as the serving robot 300 to provide the target service to the customer, with reference to a workflow assigned to the at least one serving robot 300.

Further, when the target service is a service to be provided by an employee, the target service management unit 230 according to one embodiment of the invention may provide information on the target service to at least one employee on the basis of information on task status of the at least one serving robot 300, thereby causing the at least one employee to provide the target service to the customer. According to one embodiment of the invention, whether the target service is a service to be provided by an employee may be determined according to the nature of the target service, or may be determined through customization of a user (e.g., an employee or a customer).

For example, the target service management unit 230 according to one embodiment of the invention may cause a serving robot 300 closest to the customer to be provided with the target service to provide information on the target service (e.g., information on a service to be provided, a customer to whom the service is to be provided, and a time when the service is to be provided) to at least one nearby employee using a signal such as light or sound, thereby causing the at least one employee to provide the target service to the customer.

Meanwhile, the target service management unit 230 according to one embodiment of the invention may monitor a situation in which the target service is provided to the at least one customer, and may derive the number of serving robots 300 suitable for use in the serving place on the basis of a result of the monitoring. Further, the target service management unit 230 according to one embodiment of the invention may derive the number of serving robots 300 suitable for use in the serving place on the basis of season, day of week, hours, and the like.

For example, the target service management unit 230 according to one embodiment of the invention may monitor how much a time when the target service is actually provided to the at least one customer is delayed compared to a time when the target service should be provided in terms of the workflow for the at least one customer, and when the extent of delay is not less than a predetermined level, may derive the number of serving robots 300 suitable for use in the serving place by calculating the number of serving robots 300 that are further needed in the serving place on the basis of the extent of delay (e.g., calculating the number of serving robots 300 that are further needed to make the extent of delay less than the predetermined level).

As another example, when waiting time for the at least one serving robot 300 to provide the target service to the at least one customer is not less than a predetermined level, the target service management unit 230 according to one embodiment of the invention may derive the number of serving robots 300 suitable for use in the serving place by calculating the number of serving robots 300 to be reduced in the serving place on the basis of the waiting time (e.g., calculating the number of serving robots 300 to be reduced to make the waiting time less than the predetermined level).

Next, the communication unit 240 according to one embodiment of the invention may function to enable data transmission/reception from/to the situation information acquisition unit 210, the workflow management unit 220, and the target service management unit 230.

Lastly, the control unit 250 according to one embodiment of the invention may function to control data flow among the situation information acquisition unit 210, the workflow management unit 220, the target service management unit 230, and the communication unit 240. That is, the control unit 250 according to one embodiment of the invention may control data flow into/out of the robot control system 200 or data flow among the respective components of the robot control system 200, such that the situation information acquisition unit 210, the workflow management unit 220, the target service management unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a serving robot, the method comprising the steps of:
   acquiring situation information on at least one customer;
   dynamically determining a workflow related to services to be provided to the at least one customer by the serving robot on the basis of the situation information on the at least one customer, using a workflow determination model for determining workflows related to services capable of being provided in a serving place; and
   controlling the serving robot to provide a target service to the at least one customer on the basis of the determined workflow,
   wherein the situation information on the at least one customer includes identification information on the at least one customer, order status of the at least one customer, eating status of the at least one customer, and status of service provision for the at least one customer,
   wherein the workflow for the at least one customer includes services to be provided to the at least one customer and provision priority of each of the services,
   wherein the workflow determination model is trained on the basis of the situation information on the at least one customer and the workflow for the at least one customer, in a manner to reduce differences between the services included in the workflow for the at least one customer and the provision priority of the included services, and services actually provided to the at least one customer and provision order of the actually provided services,
   wherein the target service is a service to be most preferentially provided to the at least one customer among the services included in the determined workflow,
   wherein the status of service provision for the at least one customer includes information on what service has been provided to the at least one customer and when the service has been provided to the at least one customer,
   wherein the eating status of the at least one customer includes an extent to which the at least one customer has eaten or drunk food or a drink ordered by the at least one customer, and an amount of time having elapsed from when the ordered food or drink is provided,
   wherein provision priority of a bussing service for the at least one customer is adjusted on the basis of the eating status of the at least one customer,
   wherein the services to be provided to the at least one customer include a water replenishment service by the serving robot, and
   wherein the method further comprises the step of adjusting provision priority of the water replenishment service upon an order of a drink by the at least one customer.

2. The method of claim 1, wherein in the determining step, the workflow for the at least one customer is determined on the basis of a type of the serving place.

3. The method of claim 2, wherein in the determining step, the workflow for the at least one customer is determined to include a refill food serving service when the type of the serving place is an unlimited refill restaurant, and
   wherein an interval of the refill food serving service is adjusted on the basis of the situation information on the at least one customer.

4. The method of claim 1, wherein the workflow determination model is capable of being customized by a user.

5. The method of claim 1, wherein in the controlling step, the serving robot to provide the target service is determined from among at least one serving robot, on the basis of information on task status of the at least one serving robot.

6. The method of claim 1, wherein in the controlling step, a situation in which the target service is provided is monitored, and a number of serving robots suitable for use in the serving place is derived on the basis of a result of the monitoring.

7. A non-transitory computer-readable recording medium having stored thereon a computer program for executing the method of claim 1.

8. The method of claim 1, wherein the provision priority of the bussing service increases as a number of empty dishes on a table related to the at least one customer increases.

9. A system for controlling a serving robot, the system comprising:
   a situation information acquisition unit configured to acquire situation information on at least one customer;
   a workflow management unit configured to dynamically determine a workflow related to services to be provided to the at least one customer by the serving robot on the basis of the situation information on the at least one customer, using a workflow determination model for determining workflows related to services capable of being provided in a serving place; and
   a target service management unit configured to control the serving robot to provide a target service to the at least one customer on the basis of the determined workflow,
   wherein the situation information on the at least one customer includes identification information on the at least one customer, order status of the at least one customer, eating status of the at least one customer, and status of service provision for the at least one customer,
   wherein the workflow for the at least one customer includes services to be provided to the at least one customer and provision priority of each of the services,
   wherein the workflow determination model is trained on the basis of the situation information on the at least one customer and the workflow for the at least one customer, in a manner to reduce differences between the services included in the workflow for the at least one customer and the provision priority of the included services, and services actually provided to the at least one customer and provision order of the actually provided services, wherein the target service is a service to be most preferentially provided to the at least one customer among the services included in the determined workflow, wherein the status of service provision for the at least one customer includes information on what service has been provided to the at least one customer and when the service has been provided to the at least one customer, wherein the eating status of the at least one customer includes an extent to which the at least one customer has eaten or drunk food or a drink ordered by the at least one customer, and an amount of time having elapsed from when the ordered food or drink is provided, wherein provision priority of a bussing service for the at least one customer is adjusted on the basis of the eating status of the at least one customer, wherein the services to be provided to the at least one customer include a water replenishment service by the serving robot, and wherein provision priority of the water replenishment service is adjusted upon an order of a drink by the at least one customer.

10. The system of claim 9, wherein the workflow management unit is configured to determine the workflow for the at least one customer on the basis of a type of the serving place.

11. The system of claim 10, wherein the workflow management unit is configured to:
   determine that the workflow for the at least one customer includes a refill food serving service when the type of the serving place is an unlimited refill restaurant; and
   adjust an interval of the refill food serving service on the basis of the situation information on the at least one customer.

12. The system of claim 9, wherein the workflow determination model is capable of being customized by a user.

13. The system of claim 9, wherein the target service management unit is configured to determine the serving robot to provide the target service from among at least one serving robot, on the basis of information on task status of the at least one serving robot.

14. The system of claim 9, wherein the target service management unit is configured to monitor a situation in which the target service is provided, and derive a number of serving robots suitable for use in the serving place on the basis of a result of the monitoring.

15. The system of claim 9, wherein the provision priority of the bussing service increases as a number of empty dishes on a table related to the at least one customer increases.

* * * * *